US011777929B2

(12) United States Patent
Allburn (10) Patent No.: US 11,777,929 B2
(45) Date of Patent: *Oct. 3, 2023

(54) FIELD FORENSIC METHOD TO ACQUIRE ADAPTABLE FORMAT BIOMETRIC EVIDENTIARY PROOF OF HAVING COMPLIED WITH THE SPECIAL CONSENT PROVISIONS OF COUNTRIES' DATA PROTECTION REGULATIONS

(71) Applicant: National Fingerprint, Inc., Glouster, OH (US)

(72) Inventor: David M. Allburn, Glouster, OH (US)

(73) Assignee: National Fingerprint, Inc., Glouster, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,836

(22) Filed: Oct. 8, 2021

(65) Prior Publication Data

US 2022/0046013 A1 Feb. 10, 2022

Related U.S. Application Data

(63) Continuation of application No. 16/457,959, filed on Jun. 29, 2019, now Pat. No. 11,146,549.

(Continued)

(51) Int. Cl.
*H04L 9/40* (2022.01)
*H04L 9/06* (2006.01)
(Continued)

(52) U.S. Cl.
CPC ...... *H04L 63/0861* (2013.01); *G06V 40/1365* (2022.01); *H04L 9/0643* (2013.01);
(Continued)

(58) Field of Classification Search
CPC . H04L 9/3231; H04L 9/3239; H04L 63/0853; H04L 63/108; H04L 9/0643;
(Continued)

(56) References Cited

U.S. PATENT DOCUMENTS 7,571,466 B2 * 8/2009 Mitchell ................. H04L 63/20
713/168
7,590,705 B2 * 9/2009 Mathew ................ H04L 63/101
709/227

(Continued)

*Primary Examiner* — Benjamin A Kaplan
(74) *Attorney, Agent, or Firm* — Porter, Wright, Morris & Arthur LLP (57) ABSTRACT

A computer implemented system and method for acquisition of advance consent for each instance of PII use includes the steps of receiving reference specimens for a user, electronically storing the reference specimens on a distributed block chain. When PII of the user is to be used, a consent session is electronically requested for the user. Consent-session specimens are electronically received from the user in response to the electronic request for the consent-session after completion of the consent session. The consent-session specimens include a video of the user making an affirmative consent statement, a photograph of fingerprints of the user, and a photograph of identification (ID) credentials of the user. A degree to which each of the consent-session specimens from the user match the reference specimens for the user is electronically determined and the transaction information is electronically stored on the distributed block chain.

24 Claims, 11 Drawing Sheets

Related U.S. Application Data

(60) Provisional application No. 62/691,689, filed on Jun. 29, 2018.

(51) Int. Cl.
*G06V 40/12* (2022.01)
*H04L 9/00* (2022.01)

(52) U.S. Cl.
CPC ...... *H04L 63/0853* (2013.01); *H04L 63/0876* (2013.01); *H04L 9/50* (2022.05)

(58) Field of Classification Search
CPC ... H04L 63/0876; H04L 63/0861; H04L 9/50; G06V 40/1312; G06V 40/1365
USPC ............................................................ 726/6
See application file for complete search history.

(56) References Cited

U.S. PATENT DOCUMENTS

| | | | |
|---|---|---|---|
| 8,284,019 B2* | 10/2012 | Pishva | G06V 40/19 340/5.2 |
| 2012/0249297 A1* | 10/2012 | Du | G07C 9/37 340/5.82 |
| 2013/0262873 A1* | 10/2013 | Read | H04L 63/0861 713/186 |
| 2018/0137512 A1* | 5/2018 | Georgiadis | H04L 63/08 |

* cited by examiner

FIELD FORENSIC METHOD TO ACQUIRE ADAPTABLE FORMAT BIOMETRIC EVIDENTIARY PROOF OF HAVING COMPLIED WITH THE SPECIAL CONSENT PROVISIONS OF COUNTRIES' DATA PROTECTION REGULATIONS

CROSS-REFERENCE TO RELATED APPLICATIONS

This is a continuation application of U.S. patent application Ser. No. 16/457,959 filed on Jun. 29, 1019, now U.S. Pat. No. 11,146,549 issued on Oct. 12, 2021, which claims the priority benefit of U.S. provisional patent application No. 62/691,689 filed on Jun. 29, 2018, the disclosures of which are expressly incorporated herein in their entireties by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to systems and methods for obtaining consent to use personally identifiable information and, more particularly, to such systems and methods which obtain biometrically authenticated single-instance consent to utilize personally identifiable information.

BACKGROUND OF THE INVENTION

There are many online service industries other than retail, banking, and social media, that use personally identifiable information (PII) of people ("data-subjects") residing outside the US. Most countries are deploying and enforcing data privacy regulations regarding PII for their residents. The EU's General Data Protection Regulation (GDPR), for example, took full effect in May 2018. See GDPR effective May 25, 2018 at http://www.businesslaw-magazine.com/2018/02/28/territorial-applicability-of-the-gdpr/. The GDPR requires an affected overseas party to designate in writing a representative in the EU. (Article 27 GDPR). Similar regulations are in effect already, or soon will be, for other countries. Additionally, at least three US states already regulate use of their residents' PII, of which violations in Illinois have spawned high profile class-actions law suits.

Some countries have set up privacy enforcement commissions to collect steep fines for violations by "Data Controllers" (DCs), typically global employers in heavily regulated industries. For example, see "How EU fines US companies for GDPR violations: Mechanism, authority, procedures, and analysis of likely violators" at https://community.spiceworks.com/topic/2007530-how-the-eu-can-fine-us-companies-for-violating-gdpr. Such DCs recruit management, professionals, and wealthy investors worldwide. DCs who enter US markets must submit their professionals' PII to state licensing boards. For their mostly foreign-based recruits, this attracts unwanted privacy enforcement. While enforcers expect lengthy disputes by large DCs, enforcers need quick revenue from undisputable smaller fines imposed on many smaller DCs.

For these reasons, the DCs seek dependable, capable outsources to scrupulously process this PII for them. These are the GDPR-defined "Data Processors" (DPs). These often US-based DPs fetch, store, and apply the biometrically enhanced PII for special purposes such as customizing complex licensure applications for each state board. Although each DC bears primary responsibility for compliance, it is their contracted DPs duty to assure their internal mechanisms do not expose the DC to violation risk. Typical DPs' clients are global employers who are DCs, and whose control-persons are the biometric data-subjects.

Privacy regulations in most countries share a central but exceedingly difficult requirement to obey at scale: Consent. Previously, it was typical for data-subjects to simply imply consent in widely abused ways such as checking boxes, signing waiver forms, using surrogates, or by visiting websites recording IP addresses. However, courts have ruled against all types of blanket consenting, with implication that the subject's identification be authenticated simultaneously with each act of consent to assure against fraud. Thus, positive identification, preferably by irrefutable biometrics with time-and-location stamp, must accompany each archived consent or decline, lest a regulatory violation be assessed.

Consent provisions typically now require that each DC and DP fetch, retain, and provide on demand, proof that each data subject furnished separate, authenticated, advance consent for each instance his PII was used, no matter how frequent or intrusive the act of consenting may be in actual practice. For example, see "Defining Consent" at https://www.taylorwessing.com/globaldatahub/article-understanding-consent-under-the-gdpr.html stating consent must be distinguishable from other matters, cover each relevant processing instance, be retained, be clear and concise, and must be able to be withdrawn. While the IT industry offers comprehensive and lengthy software makeovers, the notoriously underfunded privacy enforcement commissions will seek fast revenue from exemplary violations. Volunteered or solicited complaints about missing or blanket consents are the easiest violations to prove. Cross-border DPs must not wait for their DC-clients to start developing consent protocols.

Accordingly, there is a need for improved systems and methods for electronically facilitating acquisition and storage of separate, authenticated, advance consent for each instance PII is used.

SUMMARY OF THE INVENTION

Disclosed are systems and methods for facilitating acquisition and storage of separate, authenticated, advance consent for each instance PII is used which address one or more issues of the related art as described above. Disclosed is a computer implemented method for acquisition of advance consent for each instance of PII use. The method comprises the steps of, in combination, receiving reference specimens for a user and electronically storing the reference specimens. After the step of electronically storing the reference specimens, a consent session for the user is electronically requested when PII of the user is to be used. Consent-session specimens are electronically received from the user in response to the electronic request for the consent-session after the consent session is completed. The consent-session specimens include a video of the user making an affirmative consent statement, a photograph of fingerprints of the user, and a photograph of identification (ID) credentials of the user. A degree to which each of the consent-session specimens from the user match the stored reference specimens for the user is electronically determined, and transaction information is electronically stored.

Also disclosed is a system for acquisition of advance consent for each instance of PII use. The system comprises, in combination, at least one computer having memory, a processor in communication with the memory, and a network interface in communication with the processor for communicating with mobile electronic devices. The memory comprises computer-executable instructions executable by the processor to perform the following steps: electronically storing reference specimens for a user; after the step of electronically storing the reference specimens, electronically requesting a consent session for the user when PII of the user is to be used; electronically receiving consent-session specimens from the user in response to the electronic request for the consent-session after the consent session is complete; electronically determining a degree to which each of the consent-session specimens from the user match the stored reference specimens for the user; and transaction information is electronically stored. The consent-session specimens include a video of the user making an affirmative consent statement, a photograph of fingerprints of the user, and a photograph of identification (ID) credentials of the user.

Also disclosed is a computer implemented method for acquisition of advance consent for each instance of PII use. The method comprises the steps of, in combination, electronically instructing the user via a mobile electronic device to make an affirmative consent statement while a camera of the mobile electronic device records a video of the user making the affirmative consent statement, electronically instructing the user via the mobile electronic device to photograph fingerprints of the user using the camera of the mobile electronic device, electronically instructing the user via the mobile electronic device to photograph identification (ID) credentials of the user using the camera of the mobile electronic device, and electronically uploading from the mobile electronic device consent-session specimens including the video of the user making an affirmative consent statement, the photograph of fingerprints of the user, and the photograph of identification (ID) credentials of the user.

Also disclosed is a system for acquisition of advance consent for each instance of PI use. The system comprises, in combination, at least one mobile electronic device having memory, a processor in communication with the memory, and a network interface. The memory comprises computer-executable instructions executable by the processor to perform the following steps: electronically instructing the user via a mobile electronic device to make an affirmative consent statement while a camera of the mobile electronic device records a video of the user making the affirmative consent statement; electronically instructing the user via the electronic mobile electronic device to photograph fingerprints of the user using the camera of the mobile electronic device; electronically instructing the user via the mobile electronic device to photograph identification (ID) credentials of the user using the camera of the mobile electronic device; and electronically uploading from the mobile electronic device consent-session specimens including the video of the user making an affirmative consent statement, the photograph of fingerprints of the user, and the photograph of identification (ID) credentials of the user.

From the foregoing disclosure and the following more detailed description of various preferred embodiments it will be apparent to those skilled in the art that the present invention provides a significant advance in the technology and art of systems and methods for electronically facilitating acquisition and storage of separate, authenticated, advance consent for each instance PII is used. Particularly significant in this regard is the potential the invention affords for providing easy to use systems and methods for electronically facilitating in-person activities that require relatively very-short-duration simplified field mechanisms and indelibly archive indisputable forensic proofs-of-consent. Additional features and advantages of various preferred embodiments will be better understood in view of the detailed description provided below.

BRIEF DESCRIPTION OF THE DRAWINGS

These and further features of the present invention will be apparent with reference to the following description and drawings.

It should be understood that the appended drawings are not necessarily to scale, presenting a somewhat simplified representation of various preferred features illustrative of the basic principles of the invention. The specific design features of the systems as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the systems illustrated in the drawings.

DETAILED DESCRIPTION OF CERTAIN DISCLOSED EMBODIMENTS

It will be apparent to those skilled in the art, that is, to those who have knowledge or experience in this area of technology, that many uses and design variations are possible for the systems, methods, and software for electronically facilitating acquisition and storage of separate, authenticated, advance consent for each instance that personal identifiable information (PII) is used. The following detailed discussion of various alternative and preferred embodiments will illustrate the general principles of the invention with regard to a particular embodiment. Other embodiments suitable for other applications will be apparent to those skilled in the art given the benefit of this disclosure.

Figure 1:
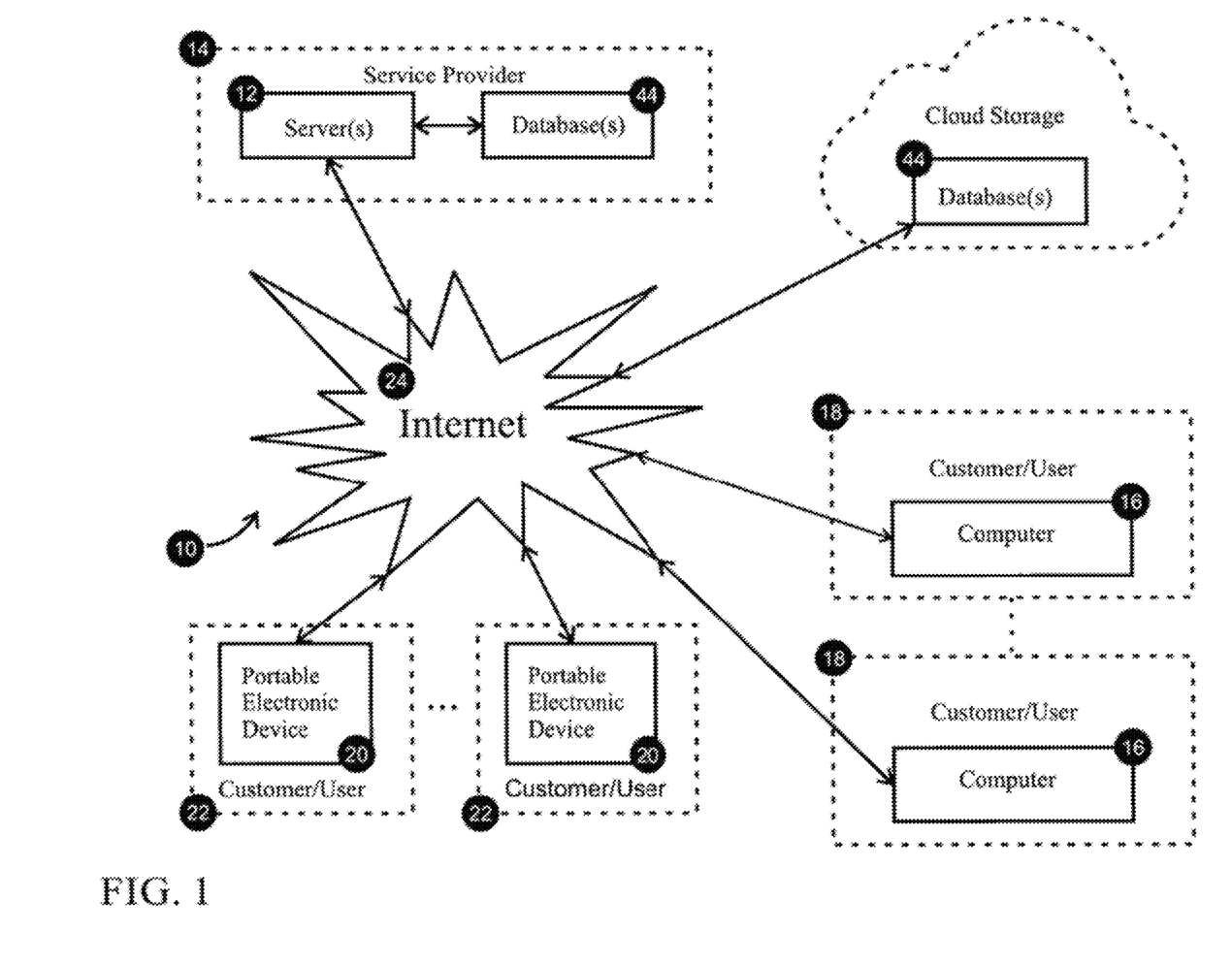
FIG. 1 is schematic view of a web-based system according to the present invention.

Referring now to the drawings, FIG. 1 illustrates a system 10 for electronically facilitating acquisition and storage of separate, authenticated, advance consent for each instance PI is used according to the present invention. The illustrated system 10 includes at least one service provider server or computer 12 located at a service provider 14, a plurality of customer or user computers 16 located at customer or user locations 18, and a plurality of mobile electronic devices or portable electronic devices 20 of customers or users 22. The term "server" is used in the specification and claims to mean a computer configured to manage, store, send and process data 24-hours a day. The term "computer" is used in the specification and claims to mean any electronic device that can suitably communicate via a computer network including, but not limited to, desktop computers, laptop computers, notebook computers, tablet computers, smart phones, personal digital assistants (PDAs), digital cameras, mp3 players, video game systems, messaging systems, video players, smart televisions, and the like. The terms "portable electronic device" and "mobile electronic device" are used in the specification and claims to mean a handheld electronic device that utilizes rechargeable batteries as a power source and that that can suitably communicate with event system server via the computer network including, but not limited to, smart phones, personal digital assistants (PDAs), mp3 or other music players, video game players, messaging systems, tablet computers, notebook computers, and the like The illustrated service provider server 12, the illustrated customer or user computers 16, and the illustrated customer or user mobile electronic devices 20 are in electronic communication with one another via a communication system 24. The illustrated communication system 24 is a computer network such as the Internet but any other suitable communication system can alternatively be utilized such as, for example, an intranet, any other type network of computers, and the like.

Figure 1A:
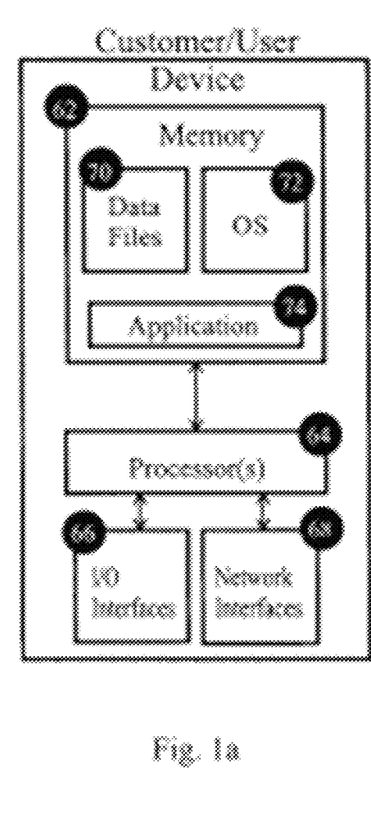
FIG. 1A is schematic view of an exemplary customer or user mobile electronic device of the system of FIG. 1.
Figure 1B:
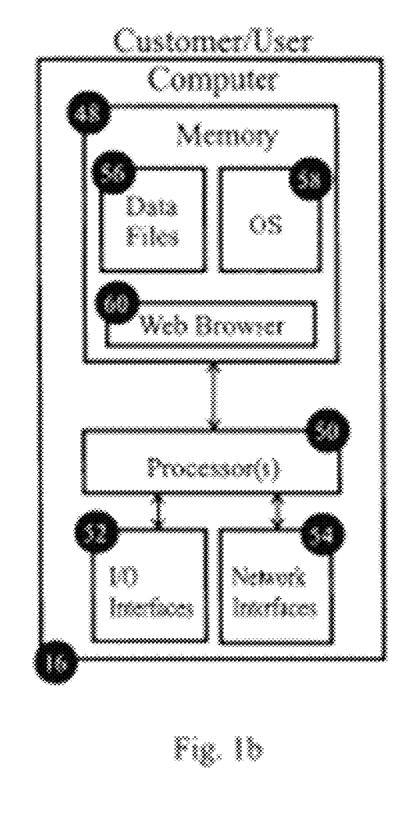
FIG. 1B is schematic view of an exemplary customer or user computer of the system of FIG. 1.
Figure 1C:
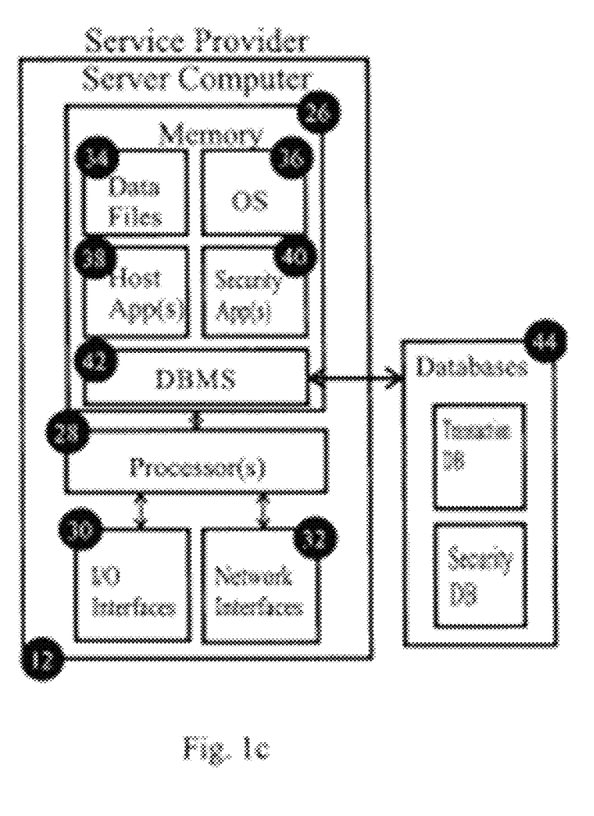
FIG. 1C is schematic view of an exemplary service provider server of the system of FIG. 1.

The illustrated service provider server or computer 12 includes memory 26, at least one processor or central processing units (CPU) 28 in communication with the memory 26, one or more input/output (IO) interfaces 30 in communication with the processor 28, and at least one network interface 32 in communication with the processor 28, all of which is configured to carry out the functions and steps described herein (best shown in FIG. 1C). The illustrated memory 26 stores data files 34, an operating system (OS) 36, host applications 38 for communications with web browsers and mobile applications or apps, security applications 40 for limiting access to authorized users, and a database management system 42 for interfacing with databases 44 having stored information. It is noted that any other suitable information and/or software can be stored in the processor 28 and/or the memory 26. The illustrated databases 44 are separate from the service provider server or computer 12 but it is noted that the databases 44 can alternatively be integrated with the service provider server or computer 12. The illustrated databases 44 are located at the service provider 14 and/or a cloud location 46 but it is noted that the databases 44 can alternatively be located at any other suitable location and/or be of any other suitable type. The illustrated databases 44 include a transaction database and a security database but any other suitable types of databases can alternatively or additionally be utilized. The at least one processor 28 can be of any suitable type. The at least one IO interface 30 can be of any suitable type such as a keyboard, a mouse, a track ball, a touch pad, a camera, a speaker, a monitor, a printer, a modem, a disk drive and the like. The network interface 32 can be of any suitable type such as, for example, a network interface card, software simulating a network card, and the like. The illustrated processor 28 and memory 26 are programmed with computer software for facilitating in-person activities or events including providing a web portal for interfacing with the sponsor computer 16 and the user mobile electronic device s 22 as described in more detail hereinafter.

The illustrated service provider server or computer 12 is located at the service provider 14 and can be accessed by customers or users 18, 22 via the communication system 24. It is noted that while the illustrated software is provided by the service provider 14 as software as a service (SaaS), the software can alternatively be provided in other suitable manners such as provided by a customer server or computer 16 and the like. It should be noted that the service provider typically provides such SaaS services to a plurality of different customers or users in the form of individuals, businesses, organizations, and the like. It is further noted that the service provider server 12 is not necessarily physically located at physical facilities of the service provider 14. In many instances the system 10 is cloud based.

The illustrated customer or user computers 16 includes memory 48, at least one processor or central processing units (CPU) 50 in communication with the memory 48, one or more input/output (IO) interfaces 52 in communication with the processor 50, and at least one network interface 54 in communication with the processor 50, all of which is configured to carry out the functions and steps described herein (best shown in FIG. 1B). The illustrated memory 48 stores data files 56, an operating system (OS) 58, and a web browser 60. It is noted that any other suitable information and/or software can be stored in the processor 50 and/or memory 48. The at least one processor 50 can be of any suitable type. The at least one IO interface 52 can be of any suitable type such as a keyboard, a mouse, a track ball, a touch pad, a camera, a speaker, a monitor, a printer, a modem, a disk drive and the like. The camera is preferably at least a 5 megapixel camera with an LED flash. The camera preferably can take still images as well as video or moving images as described in more detail below. The network interface 54 can be of any suitable type such as, for example, a network interface card, software simulating a network card, and the like. The illustrated processor 50 and memory 48 are programmed with the web browser 60 for communicating with the web portal of the service provider server 12 as described in more detail hereinafter.

The illustrated customer or user computers 16 are located at the customer or user 18 such as, for example, a home or place of business of the customer or user 18 but it is noted that the customer or user computer 16 can be located at any other suitable location. It is noted that the customer or user computer 16 can be a desktop computer or a mobile computer. It is noted that that while the illustrated system 10 shows a two customer or user computers 16, it should be appreciated that there is typically more than two customers or users 18 having customer or user computers 16.

The illustrated user mobile electronic devices 20 each include memory 62, at least one processor or central processing units (CPU) 64 in communication with the memory 62, one or more input/output (IO) interfaces 66 in communication with the processor 64, and at least one network interface 66 in communication with the processor 62, all of which is configured to carry out the functions and steps described herein (best shown in FIG. 1A). The illustrated memory 62 stores data files 70, an operating system (OS) 72, and a mobile application or app 74. It is noted that any other suitable information and/or software can be stored in the processor 64 and/or memory 66. The at least one processor 64 can be of any suitable type. The at least one IO interface 66 can be of any suitable type such as a keyboard, a mouse, a track ball, a touch pad, a camera, a speaker, a touch screen, and the like. The camera is preferably at least a 5 megapixel camera with an LED flash. The camera preferably can take still images as well as video or moving images as described in more detail below. The network interface 68 can be of any suitable type such as, for example, a network interface card, software simulating a network card, and the like. The illustrated processor 64 and memory 62 are programmed with the mobile app or application 74 for communicating with the web portal of the service provider server 12 as described in more detail hereinafter. The terms "mobile app" and "mobile application" are used in the specification and claims to mean a type of application software designed to run on a mobile electronic device to provide users with similar services to those accessed on personal computers.

The illustrated user mobile electronic devices 20 are typically physically located with the users 22, that is physically located wherever the users are located. It is noted that that while the illustrated system 10 shows a two users 22 having mobile electronic devices 20, it should be appreciated that there is typically more than two users 22 having mobile electronic devices 20.

The illustrated system software or web platform resides at the service provider server 12 and is accessible to the customers or users 18 via a web portal or dashboard on the customer computer 16 and to users 22 via a mobile application dashboard or home page on the user's mobile electronic devices 20. The system software and the mobile application are configured to carry out the following methods for acquiring and storing separate, authenticated, advance consent for each instance PII is used. It is noted that while the following description is described with regard to the mobile electronic devices 20, the method can be alternatively or additionally carried out on the customer or user computers 16.

Figure 2:
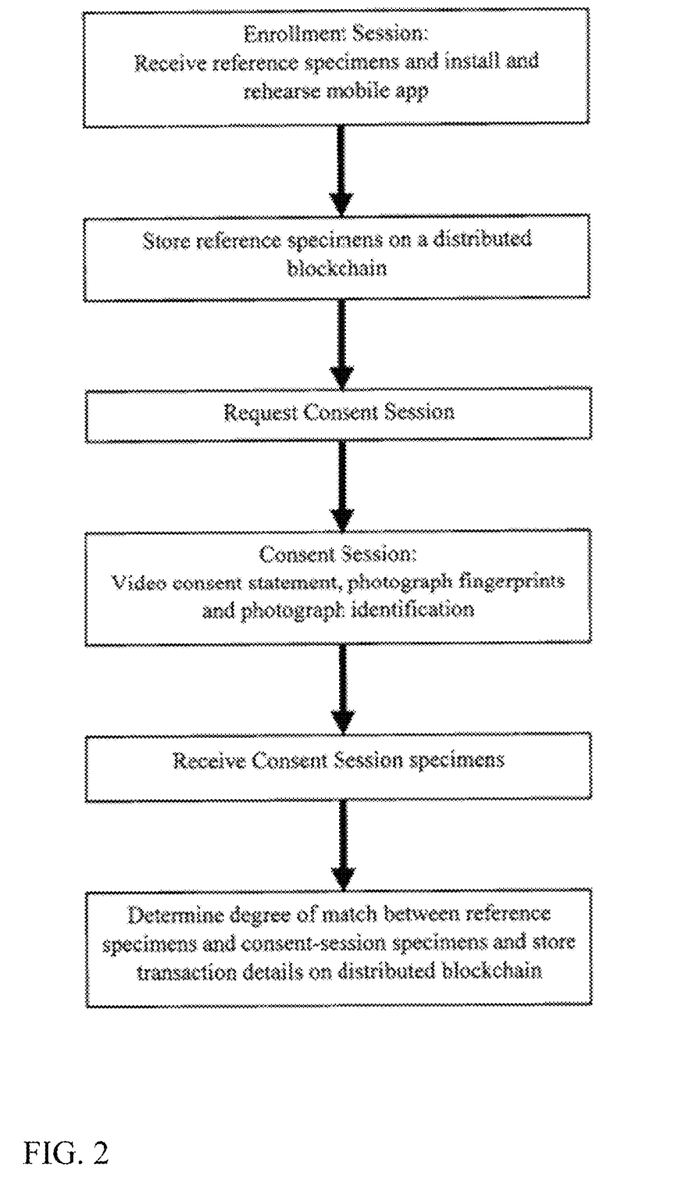
FIG. 2 is a block diagram illustrating an exemplary method for obtaining biometrically authenticated single-instance consent to utilize personally identifiable information from the system of FIG. 1.

FIG. 2 illustrates a flow diagram showing an exemplary method for obtaining separate, authenticated, advance consent for each instance PII is used. This exemplary method is a 6-step process that configures rapid repetitive consents for dispositive evidentiary presentment.

In step 1, a witnessed one-time enrollment session occurs which (a) harvests and ships, under an evidence chain-of-custody procedure, a user's multiple biometric and photographic reference specimens and (b) installs and rehearses a mobile application for a mobile electronic device which is part of the mechanism embodiment, located on the user's mobile electronic device. Methods in this applicant's U.S. Pat. No. 8,398,118 can be used for collection of fingerprint reference specimens and positive identification (ID) for the user. The disclosure of U.S. Pat. No. 8,398,118 is expressly incorporated herein in its entirety by reference. It is noted that any other suitable method for suitably collecting of biometric and photographic reference specimens under an evidence chain-of-custody procedure can alternatively be utilized. The user can download the mobile application to their mobile electronic device in any suitable manner such as, for example, an online app store. Once downloaded to the user's mobile electronic device, the mobile application will automatically require the user to rehearse a consent session. The user can repeat the rehearsal as often as desired so that the consent session can become well-rehearsed and thus can be completed in a short period of time. The consent session is described in more detail below.

In step 2, the reference specimens received in step 1 are uploaded or installed onto a distributed block chain of the service provider that is configured for speed and other desired attributes suitable for this biometric purpose. The block chain enables the reference specimens and related information to be securely stored without alteration. It is noted that any other suitable method for suitably electronically storing the reference specimens and related information can alternatively be utilized.

In step 3, when advance consent is required, an interactive query is transmitted to the user's mobile electronic device requesting a brief consent-session for a single specified instance-of-use for the user's private data or PII, and phrasing a brief affirmative answer conforming to the European Union's GDPR or other jurisdiction's privacy regulation. The interactive query is preferably transmitted by email but can alternatively be transmitted in any other suitable manner such as, for example, text message, imessage, SMS, MMS, and the like.

Figure 3:
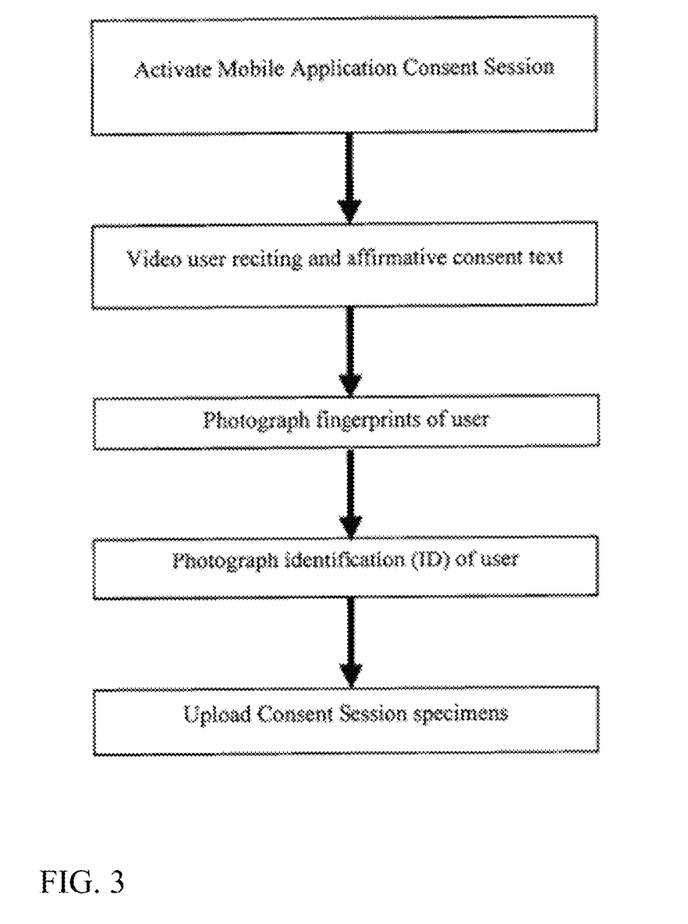
FIG. 3 is a block diagram illustrating sub-steps of the step of a consent session of the method of FIG. 2.
Figure 4:
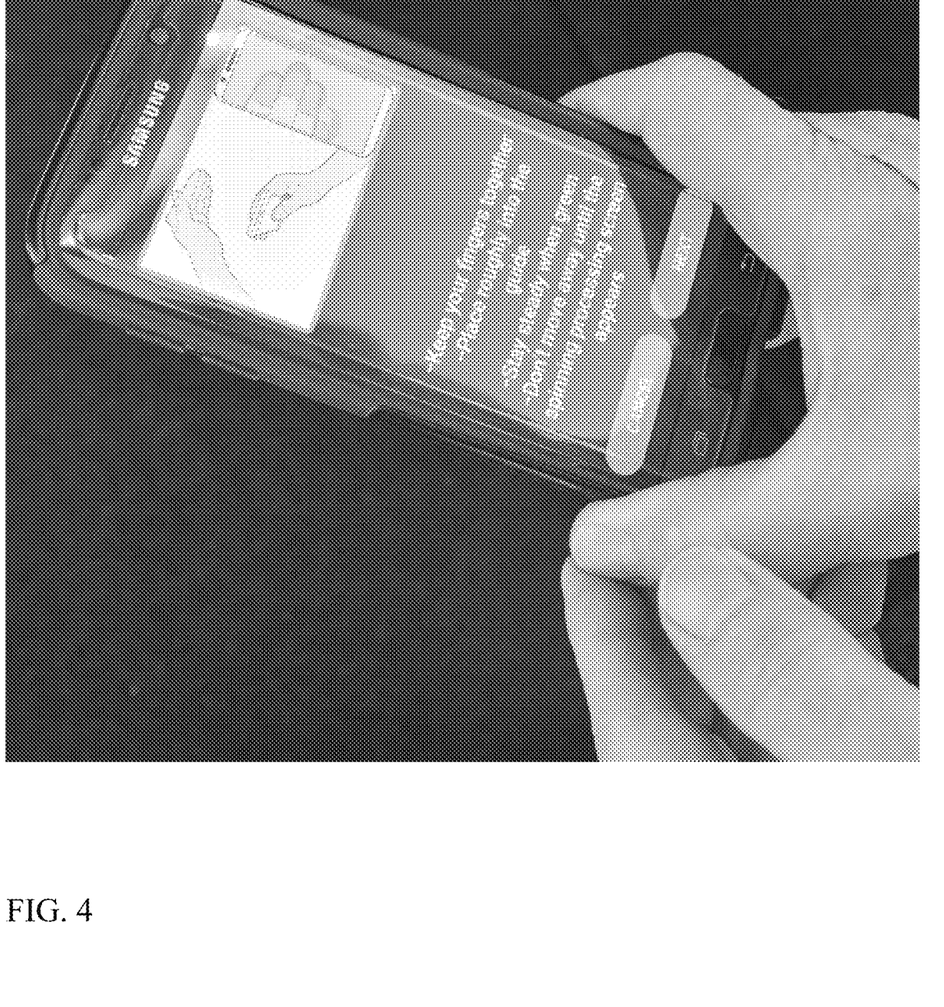
FIG. 4 is front view of an exemplary user mobile electronic device providing instructions for the user to photograph their fingerprints with a camera of their mobile electronic device according to of the method of FIGS. 2 and 3.
Figure 5:
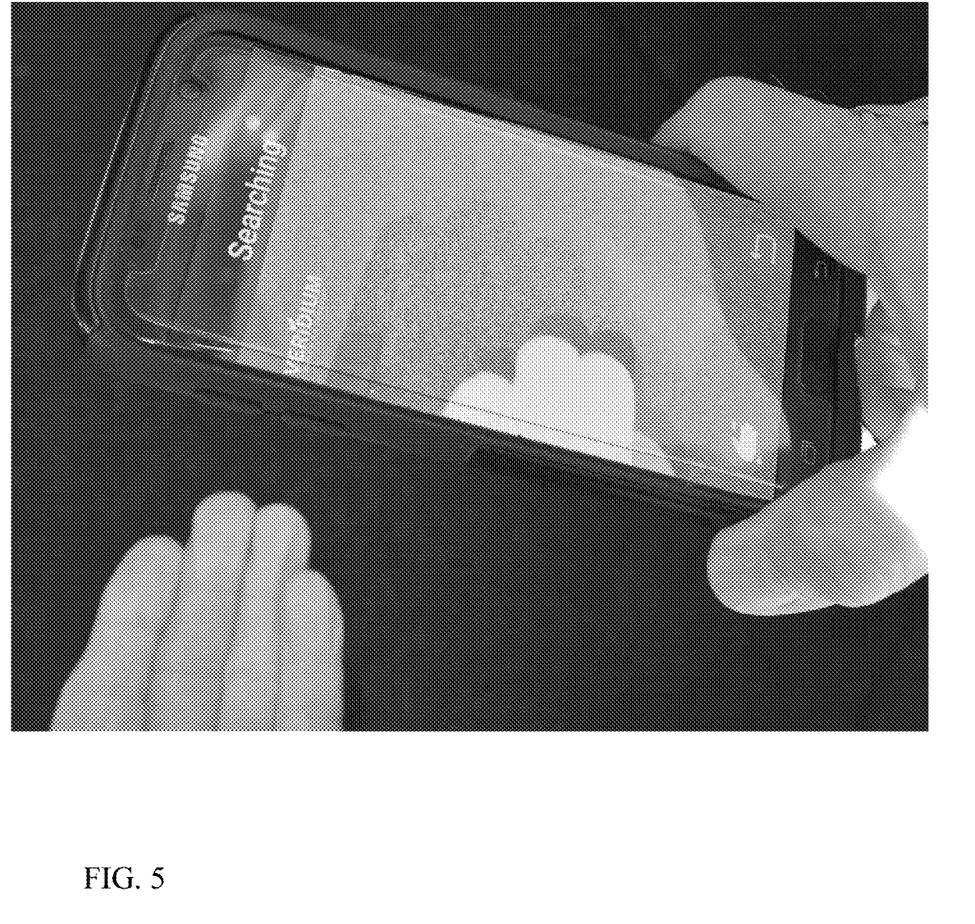
FIG. 5 is front view of the exemplary user mobile electronic device of FIG. 4 wherein the mobile app is automatically searching for the user's fingers.
Figure 6:
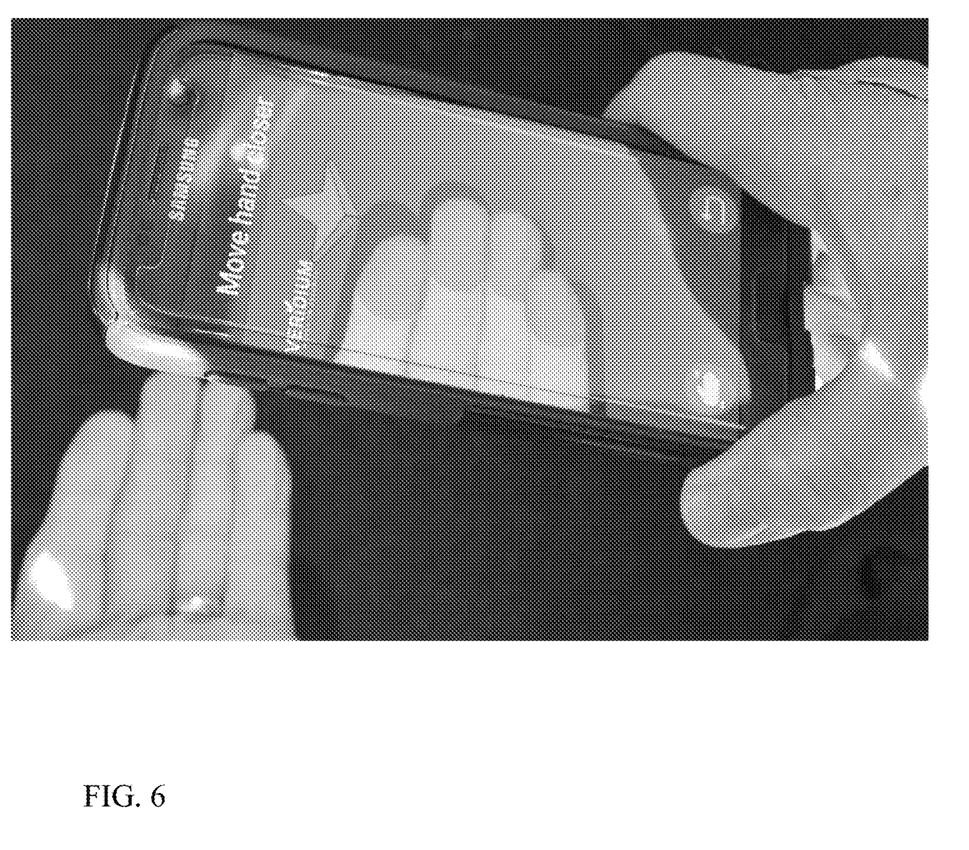
FIG. 6 is front view of the exemplary user mobile electronic device of FIGS. 4 and 5 wherein the mobile app is automatically instructing the user to move their fingers closer to the camera of the mobile electronic device.
Figure 7:
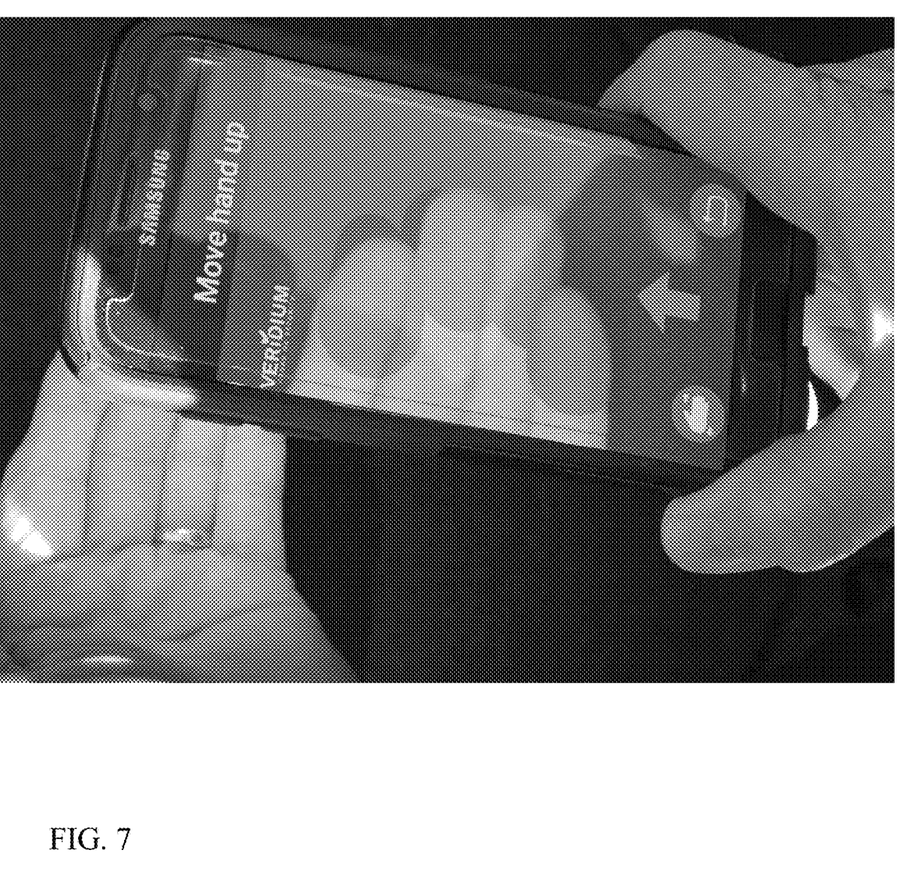
FIG. 7 is front view of the exemplary user mobile electronic device of FIGS. 4 to 6 wherein the mobile app is automatically instructing the user to move their fingers up toward the top of the mobile electronic device.
Figure 8:
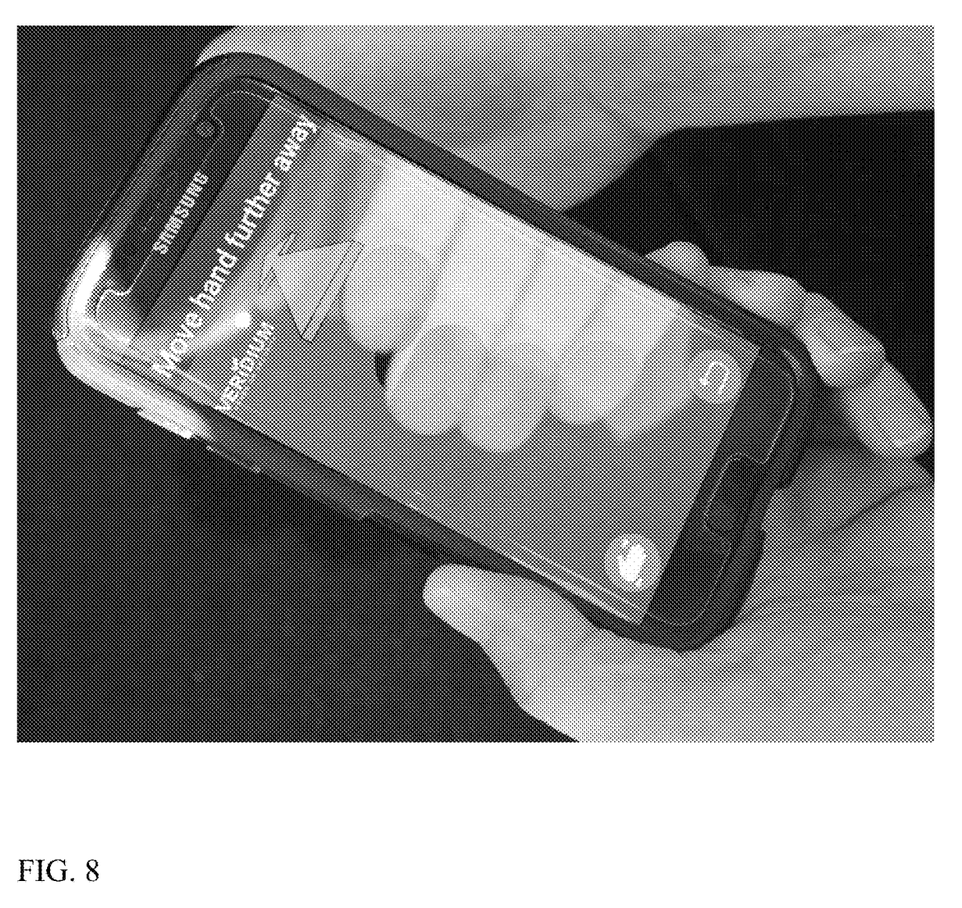
FIG. 8 is front view of the exemplary user mobile electronic device of FIGS. 4 to 7 wherein the mobile app is automatically instructing the user to move their fingers further away from the camera of the mobile electronic device.
Figure 9:
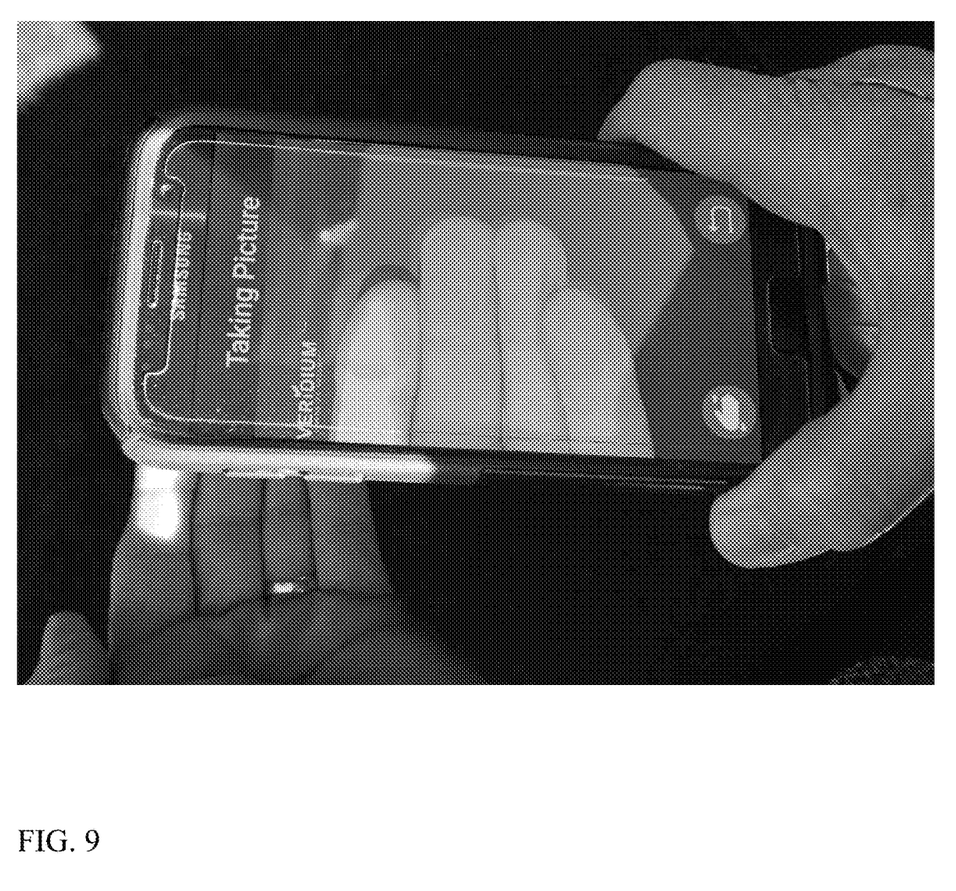
FIG. 9 is front view of the exemplary user mobile electronic device of FIGS. 4 to 8 wherein the mobile app is automatically taking a photograph of the user's fingers when their fingers are correctly positioned relative to the camera of the mobile electronic device.

In step 4, the well-rehearsed consent session is performed by the mobile application installed on the user's mobile electronic device as best seen in FIG. 3. When the user activates the mobile application, the mobile application automatically (a) initiates a video selfie of the user using the mobile electronic device camera while the user recites an affirmative consent-text from a screen crawler on the display screen of the mobile electronic device, (b) snaps a flashlight photo of the user's four fingers using the mobile electronic device camera, and (c) facilitates a desktop photograph of the user's identification (ID) credentials. It is noted that the affirmative consent-text can be provided to the user by the screen crawler or alternatively by any other suitable manner. It is also noted that the video provides evidence of the consent as well as face shots and voice prints for the user.

Figure 10:
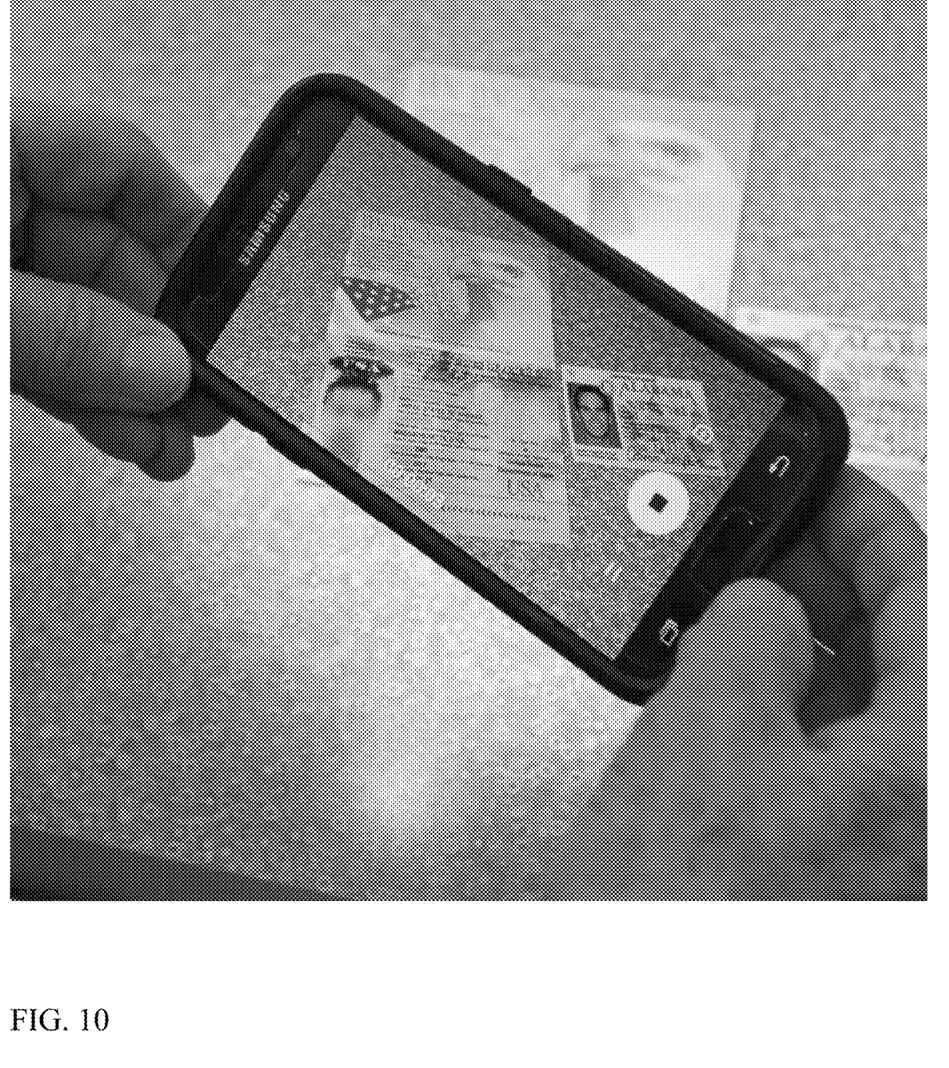
FIG. 10 is front view of an exemplary user mobile electronic device providing instructions for the user to photograph identification documents with photographs using their mobile electronic device according to of the system of FIG. 1.

The video is preferably of a short length such as, for example, about 5 seconds but any other suitable length can be utilized. FIGS. 4 to 9 show how the mobile application instructs the user to properly position their four fingers so that the mobile electronic device camera can automatically take a photograph of their fingerprints. It is noted that the fingerprints can alternatively be photographed in any other suitable manner. FIG. 10 shows how the mobile application instructs the user to properly position their identification (ID) credentials on the desktop so that the mobile electronic device camera can automatically take a photograph of their identification (ID) credentials. The photographic capture of four fingers biometric by the mobile electronic device can be performed using "4 Fingers Export" available from Veridium US located at 100 Hancock St $10^{th}$ Floor, Quincy MA 02171. It is noted, however, that any other suitable fingerprint capture software can alternatively be utilized. The illustrated identification (ID) credentials are a passport with photo and driver's license with photo but it is noted that the identification (ID) credentials can alternatively be of any other suitable type. The mobile application is configured so that the consent session can be completed in a brief period of time because it may be required many times in a single day. Preferably, the consent session can be completed in less than about one minute, more preferably the consent session can be completed in less than about 30 seconds, and most preferably the consent session can be completed in about 10 seconds or less.

In step 5, the mobile application automatically and securely uploads the compressed, encrypted data of the consent-session specimens from the consent session (video of affirmative statement, photograph of fingerprints, and photograph of identification (ID) credentials) from the user's mobile electronic device to the service provider as soon as an acceptable Wi-Fi connection becomes available for the mobile electronic device.

In step 6, the degree to which each of the uploaded consent-session specimens from the user's consent-session matches its reference-twin of the reference specifications using FBI-approved APIs and memorializes the transaction details by storing the transaction information on the distributed block chain. This degree of match can be used to determine if the consent is accepted or declined. The distributed block chain biometrics repository, harvests and authenticates both accepted and declined consent transactions from the consent sessions of the user, storing the transactions as nascent, indelible, pre-formatted privacy compliance reports for use by the data processor (DP) and the data controller (DC) to deter unjust findings of violation. The back office offline processing of fingerprints from the consent-session to match the fingerprints of the reference specimens can be performed using "NexaIFingerprint" available from Aware, Inc. located at 40 Middlesex Turnpike, Bedford, MA 01730. It is noted, however, that any other suitable fingerprint processing software can alternatively be utilized. The back office offline processing of the video selfie from the consent session to match facial biometric to the reference specimens can be performed using "IFace SDK" available from Innovatrics. s.r.o. located at Jarosova 1, Bratislava, Slovak republic 831-03. It is noted, however, that any other suitable facial processing software can alternatively be utilized. The back office offline processing of the video selfie from the consent-session to harvest voiceprint can be performed using software available from Voicetrust GmbH, Hofmannstr. 25-27, Munich Germany D-81379. It is noted, however, that any other suitable voice harvesting software can alternatively be utilized.

Any of the features or attributes of the above described embodiments and variations can be used in combination with any of the or features and attributes of the above described embodiments and variations as desired.

It is apparent from the above detailed description of preferred embodiments of the present invention, that the above-disclosed systems, methods, and software are designed to electronically facilitating a vetted consent-as-a-service, ordered, paid, and executed by-the-click. It is also apparent from the above detailed description that Applicant's consent mechanism has many advantages over prior art consent mechanisms as outlined in the following table:

| Basis of Comparison | Prior Art Consent Mechanisms | Applicant's Consent Mechanisms. |
|---|---|---|
| Purpose of mechanism | Achieve administrative clerical approval at the time of consenting. | Qualify as to format and content for dispositive presentment in a court to refute alleged consent violation in any applicable jurisdiction judged by any current or past regulatory standard. |
| Design Goals of mechanism | "Checklist compliance" based on programmers' opinions of regulators' interpretations at the time consent was made, for a chosen jurisdiction | "Evidentiary-by-design" based on legal opinions and case law, configured to aid legal counsel with dispositive presentment that deters or refutes allegations of data privacy violations involving "Regular and Special Consent," according to current updated regulations. |
| Adaptability of mechanism to meet subsequent regulatory changes and interpretations | Not adaptable. Requires choices which freeze format, content & configuration of the Consent so that data only meets specs at time taken. | Inherently adaptable. Nimble XML transaction block chain storage method enables agile reconfiguration of native evidentiary presentment format into current regulatory formats for any or many jurisdictions at once. |
| Durability, Vulnerability of the mechanism to data theft or alteration | Vulnerable. Conventional storage & backup methods are the same as used by Equifax | Immune. Data parsed & distributed across many block chain nodes, immune to degradation, alteration, erasure, or theft. |
| Scalability of consent sessions to accommodate likely multiple daily consenting | Incapable. All-purpose consent session too lengthy to endure more than once a day. | Inherently scalable. Consent-session time typically under the "minute-limit," easily tolerable by consenters likely needing to endure multiple daily consent sessions. |
| Speed of the mechanism's back office record creation and retrieval | Slow on conventional styles of block chain maladapted to accommodate biometric matching. | Fast on parallel channels and multiple ledger style of the distributed block chain instance specially built to accommodate biometrics. |

It in also apparent from the above detailed description of preferred embodiments of the present invention, that the above-disclosed systems, methods, and software can be modified to include additional or alternative features.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled

What is claimed is:

1. A computer implemented method for acquisition of advance consent for each instance of PII use, said method comprising the steps of, in combination:
    electronically requesting a consent session for a user when PII of the user is to be used;
    electronically receiving at least one consent-session specimen from the user in response to the electronic request for the consent-session;
    wherein the at least one consent-session specimen includes a video of the user making an affirmative consent statement,
    electronically determining a degree to which each of the at least one consent-session specimens from the user match electronically stored reference specimens previously received and stored for the user; and
    electronically storing transaction information.

2. The computer implemented method for acquisition of advance consent for each instance of PII use according to claim 1, further comprising the step of electronically scrolling the affirmative consent statement on a display screen while the camera records the video of the user making the affirmative consent statement.

3. The computer implemented method for acquisition of advance consent for each instance of PII use of claim 1, wherein the electronically stored reference specimens include biometric and photographic reference specimens.

4. The computer implemented method for acquisition of advance consent for each instance of PII use of claim 1, wherein the step of electronically determining a degree to which the at least one consent-session specimen from the user matches the stored reference specimens for the user includes a facial recognition comparison, and a voice print comparison.

5. The computer implemented method for acquisition of advance consent for each instance of PII use of claim 1, wherein the step of electronically storing transaction information includes storing the transaction information on a block chain.

6. The computer implemented method for acquisition of advance consent for each instance of PII use of claim 5, wherein the transaction information is stored as a nascent, indelible, pre-formatted privacy compliance report.

7. A system for acquisition of advance consent for each instance of PII use, said system comprising, in combination:
    at least one computer having memory, a processor in communication with the memory, and a network interface in communication with the processor for communicating with mobile electronic devices; and
    wherein the memory comprising computer-executable instructions executable by the processor to perform the following steps:
        electronically requesting a consent session for the user when PII of the user is to be used;
        electronically receiving at least one consent-session specimen from the user in response to the electronic request for the consent-session;
        wherein the at least one consent-session specimens includes a video of the user making an affirmative consent statement;
        electronically determining a degree to which each of the at least one consent-session specimen from the user match a stored reference specimens previously received and stored for the user; and
        electronically storing transaction information.

8. The system for acquisition of advance consent for each instance of PII use of claim 7, further comprising electronically scrolling the affirmative consent statement on a display screen while the camera records the video of the user making the affirmative consent statement.

9. The system for acquisition of advance consent for each instance of PII use of claim 7, wherein the electronically stored reference specimens include biometric and photographic reference specimens.

10. The system for acquisition of advance consent for each instance of PII use of claim 7, wherein the step of electronically determining a degree to which each of the consent-session specimens from the user match the stored reference specimens for the user includes a facial recognition comparison and a voice print comparison.

11. The system for acquisition of advance consent for each instance of PII use of claim 7, wherein the step of electronically storing transaction information includes storing the transaction information on a block chain.

12. The system for acquisition of advance consent for each instance of PII use of claim 11, wherein the transaction information is stored as a nascent, indelible, pre-formatted privacy compliance report.

13. A computer implemented method for acquisition of advance consent for each instance of PII use, said method comprising the steps of, in combination:
    electronically instructing a user to make an affirmative consent statement while a camera records a video of the user making the affirmative consent statement;
    electronically determining a degree to which the video of the user matches stored reference facial and voice specimens previously received and stored for the user; and
    electronically storing transaction information.

14. The computer implemented method for acquisition of advance consent for each instance of PII use according to claim 13, further comprising the step of electronically scrolling the affirmative consent statement on a display screen while the camera records the video of the user making the affirmative consent statement.

15. The computer implemented method for acquisition of advance consent for each instance of PII use of claim 13, wherein the electronically stored reference specimens include biometric and photographic reference specimens.

16. The computer implemented method for acquisition of advance consent for each instance of PII use of claim 13, wherein the step of electronically determining a degree to which the video of the user matches the electronically stored reference specimens for the user includes a facial recognition comparison, and a voice print comparison.

17. The computer implemented method for acquisition of advance consent for each instance of PII use of claim 13, wherein the step of electronically storing transaction information includes storing the transaction information on a block chain.

18. The computer implemented method for acquisition of advance consent for each instance of PII use of claim 17, wherein the transaction information is stored as a nascent, indelible, pre-formatted privacy compliance report.

19. A system for acquisition of advance consent for each instance of PII use, said system comprising, in combination:
- at least one electronic device having memory, a processor in communication with the memory; and
- wherein the memory comprising computer-executable instructions executable by the processor to perform the following steps:
  - electronically instructing a user to make an affirmative consent statement while a camera records a video of the user making the affirmative consent statement;
  - electronically determining a degree to which the video of the user matches stored reference facial and voice specimens previously received and stored for the user; and
  - electronically storing transaction information.

20. The system for acquisition of advance consent for each instance of PII use according to claim 19, further comprising the step of electronically scrolling the affirmative consent statement on a display screen while the camera records the video of the user making the affirmative consent statement.

21. The system for acquisition of advance consent for each instance of PII use of claim 19, wherein the electronically stored reference specimens include biometric and photographic reference specimens.

22. The system for acquisition of advance consent for each instance of PII use of claim 19, wherein the step of electronically determining a degree to which each of the video of the user matches the electronically stored reference specimens for the user includes a facial recognition comparison and a voice print comparison.

23. The system for acquisition of advance consent for each instance of PII use of claim 19, wherein the step of electronically storing transaction information includes storing the transaction information on a block chain.

24. The system for acquisition of advance consent for each instance of PII use of claim 23, wherein the transaction information is stored as a nascent, indelible, pre-formatted privacy compliance report.

* * * * *